US011080654B2

(12) United States Patent
Ferreira Moreno et al.

(10) Patent No.: US 11,080,654 B2
(45) Date of Patent: Aug. 3, 2021

(54) COGNITIVE COMPUTING TECHNIQUES FOR OPTIMAL COLLABORATION PARTICIPANT SELECTION

(71) Applicant: International Business Machines Corporation, Armonk, NY (US)

(72) Inventors: Marcio Ferreira Moreno, Rio de Janeiro (BR); Rafael Rossi De Mello Brandao, Rio de Janeiro (BR); Juliana Soares Jansen Ferreira, Rio de Janeiro (BR); Ana Fucs, Rio de Janeiro (BR); Renato Fontoura De Gusmão Cerqueira, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 15/853,382

(22) Filed: Dec. 22, 2017

(65) Prior Publication Data
US 2019/0197478 A1  Jun. 27, 2019

(51) Int. Cl.
*G06Q 10/10* (2012.01)
*H04L 29/06* (2006.01)
(Continued)

(52) U.S. Cl.
CPC ....... *G06Q 10/101* (2013.01); *G06F 16/3344* (2019.01); *G06F 16/435* (2019.01);
(Continued)

(58) Field of Classification Search
CPC ............ G06Q 10/101; G06Q 30/0204; G06Q 10/1095; G06Q 10/06311; G06Q 10/063112; G06Q 10/06398; G06Q 10/063114; G06Q 10/063118; G06Q 10/109; G06Q 10/10; H04L 65/1069; H04L 65/403; H04L 65/1093; H04L 29/06401; H04L 12/1813; H04L 12/1822;
(Continued)

(56) References Cited

U.S. PATENT DOCUMENTS 5,974,396 A   10/1999  Anderson et al.
8,266,098 B2   9/2012  Hu et al.
(Continued)

*Primary Examiner* — David T. Brooks
(74) *Attorney, Agent, or Firm* — Patterson + Sheridan, LLP

(57) ABSTRACT

Method and apparatus for monitoring collaboration parameters and maintaining user profiles using cognitive computing techniques are provided. The method includes receiving a domain for a first collaborative session, and retrieving a plurality of trait profiles associated with potential participants. The method further includes determining a subset of trait profiles based in part on comparing each respective trait profile with the rest of the trait profiles, and providing the subset of trait profiles. Additionally, the method includes receiving an indication that the subset of trait profiles is acceptable, and a request to initiate the first collaborative session with participants corresponding to the subset of trait profiles. The method includes initializing a plurality of sensor devices, detecting a first contribution from a first participant, classifying the first contribution using cognitive computing techniques, identifying a trait profile corresponding to the first participant, and updating the identified trait profile.

20 Claims, 10 Drawing Sheets

(51) Int. Cl.
  *H04L 29/08* (2006.01)
  *G06Q 30/02* (2012.01)
  *G06F 16/33* (2019.01)
  *G06F 16/903* (2019.01)
  *G06Q 10/06* (2012.01)
  *H04L 12/18* (2006.01)
  *G06F 16/435* (2019.01)

(52) U.S. Cl.
  CPC ...... *G06F 16/437* (2019.01); *G06F 16/90335* (2019.01); *G06Q 10/06311* (2013.01); *G06Q 10/063112* (2013.01); *G06Q 10/1095* (2013.01); *G06Q 30/0204* (2013.01); *H04L 12/1818* (2013.01); *H04L 12/1822* (2013.01); *H04L 65/1069* (2013.01); *H04L 65/1086* (2013.01); *H04L 65/1093* (2013.01); *H04L 65/403* (2013.01); *H04L 67/148* (2013.01)

(58) Field of Classification Search
  CPC ...... H04N 7/15; H04M 3/56; G06F 16/90335; G06F 16/3344; G06F 16/335; G06F 16/337; G06F 16/435; G06F 16/437
  See application file for complete search history.

(56) References Cited

U.S. PATENT DOCUMENTS

| | | | |
|---|---|---|---|
| 8,943,131 B2 | 1/2015 | Fontenot et al. | |
| 9,465,505 B1* | 10/2016 | Moody | H04N 7/147 |
| 10,007,721 B1* | 6/2018 | Klein | G06Q 50/01 |
| 2007/0005698 A1 | 1/2007 | Kumar et al. | |
| 2010/0114673 A1* | 5/2010 | Briggs | G06Q 10/06398 705/7.42 |
| 2013/0006681 A1* | 1/2013 | Kelkar | G06Q 10/00 705/7.11 |
| 2013/0117279 A1* | 5/2013 | Massey | G06Q 10/10 707/748 |
| 2013/0254298 A1* | 9/2013 | Lorphelin | G06Q 10/10 709/205 |
| 2013/0326346 A1* | 12/2013 | Zhu | G06Q 10/101 715/260 |
| 2014/0025667 A1* | 1/2014 | Lowe | G06Q 10/101 707/723 |
| 2014/0181098 A1 | 6/2014 | Bhandari et al. | |
| 2015/0154291 A1* | 6/2015 | Shepherd | H04L 65/403 707/748 |
| 2015/0326625 A1* | 11/2015 | Rosenberg | H04L 67/42 715/753 |
| 2015/0339020 A1* | 11/2015 | D'Amore | G06Q 10/101 715/753 |
| 2016/0030834 A1* | 2/2016 | Brown | A63F 13/21 463/36 |
| 2016/0117624 A1* | 4/2016 | Flores | H04L 67/306 705/7.39 |
| 2016/0170967 A1* | 6/2016 | Allen | G06F 40/279 704/9 |
| 2016/0239573 A1* | 8/2016 | Albert | G06F 16/2379 |
| 2018/0007100 A1* | 1/2018 | Krasadakis | G06Q 10/1095 |
| 2018/0114238 A1* | 4/2018 | Treiser | G06Q 50/01 |
| 2019/0297126 A1* | 9/2019 | Graziano | G06F 16/4393 |

* cited by examiner

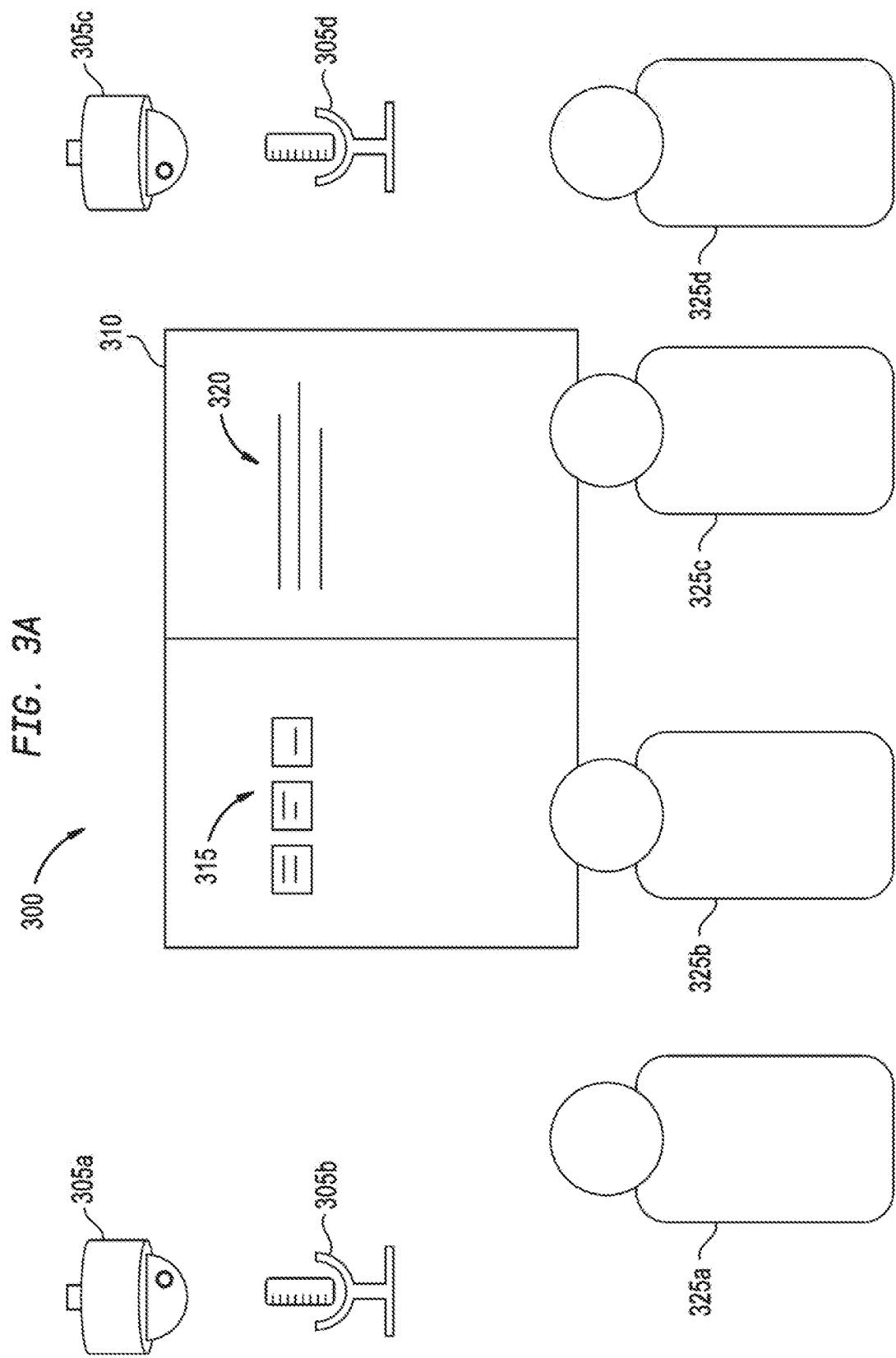

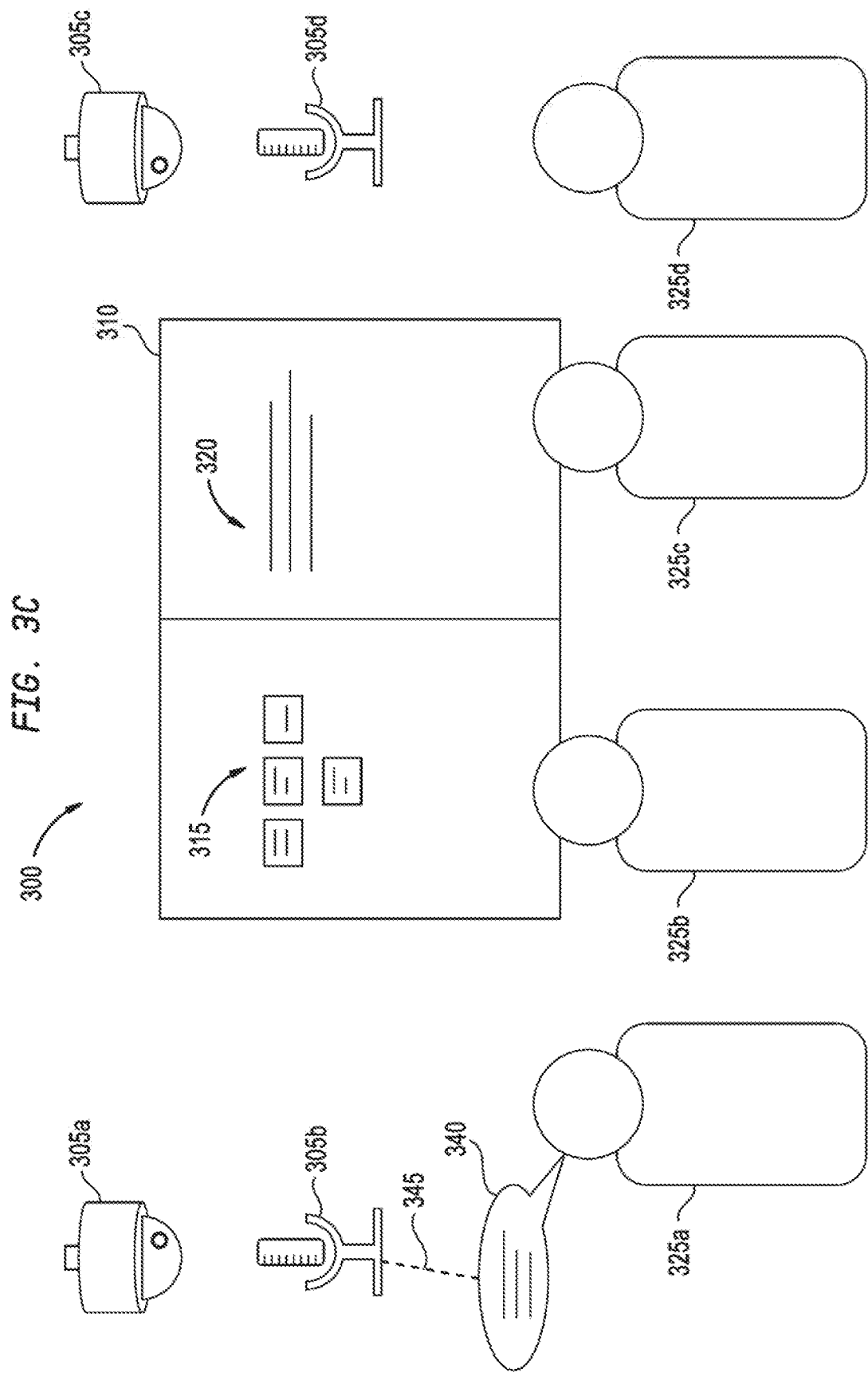

US 11,080,654 B2

COGNITIVE COMPUTING TECHNIQUES FOR OPTIMAL COLLABORATION PARTICIPANT SELECTION

BACKGROUND

The present invention relates to cognitive computing, and more specifically, to cognitive computing techniques for monitoring collaboration parameters and maintaining user profiles using cognitive computing.

Collaborative problem solving is an important tool in many organizations. For example, design thinking (DT) is a process involving multi-user collaboration and the acquisition of information and knowledge, as well as analysis of proposed solutions. Collaborative participation aims to create and discuss solutions, often with a multi-disciplined approach that requires individuals who are proficient in diverse fields. Collaborative sessions are generally utilized to discuss particular issues or concepts, often within a specified domain or scope. For example, a meeting to discuss a potential new product may require expertise on engineering and architecture, software and hardware design, market research and advertising, and the like. In addition to the expertise possessed by each participant, the social behavior, personality, and participation of each participant can play a significant part in how the session proceeds, which can have a large effect on the quality of the solution. However, there are no established procedures or processes to select participants in an objective manner based on prior collaborations in order to ensure the optimal mix of individuals.

SUMMARY

According to one embodiment of the present disclosure, a system including a processor, one or more sensor devices, and a computer memory storing a program is disclosed. The program is executable by the computer processor to perform an operation comprising receiving, from a user, a request to initiate a first collaborative session and initializing one or more sensor devices. Using at least one of the sensor devices, the computer-readable program code detects a first contribution from a first participant in the first collaborative session. The operation further includes classifying the contribution by processing the first contribution using one or more cognitive computing techniques, identifying a first trait profile corresponding to the first participant, and updating the first trait profile based on the classified first contribution. Finally, the operation includes selecting the first participant to participate in a second collaborative session, based at least in part on the updated first trait profile.

According to a second embodiment of the present disclosure, a computer-readable storage medium having computer-readable program code embodied therewith is disclosed. The computer-readable program code is executable by one or more computer processors to perform an operation comprising receiving, from a user, a domain for a collaborative session. The operation further includes retrieving a plurality of trait profiles corresponding to potential participants, wherein each of the plurality of trait profiles comprises a social characteristic of the respective potential participant. Additionally, the operation includes determining, using a one or more cognitive computing techniques, a subset of trait profiles from the plurality of trait profiles, based on the received domain and further based on comparing each respective trait profile with the rest of the plurality of trait profiles, and providing, to the user, the subset of trait profiles. Finally, the operation includes receiving, from the user, a rejection of a first trait profile in the subset of trait profiles, and adjusting weights of the one or more cognitive computing techniques based on the rejection.

According to a third embodiment of the present disclosure, a method is disclosed. The method includes receiving, from a user, a domain for a first collaborative session, and retrieving a plurality of trait profiles associated with potential participants. The method also includes determining, using a machine learning model, a subset of trait profiles from the plurality of trait profiles, based on the received domain and further based on comparing each respective trait profile with the rest of the plurality of trait profiles and providing, to the user, the subset of trait profiles. The method further includes receiving, from the user, an indication that the subset of trait profiles is acceptable, and receiving, from the user, a request to initiate the first collaborative session with a plurality of participants corresponding to the subset of trait profiles. The method additionally includes initializing a plurality of sensor devices and detecting, using at least one of the plurality of sensor devices, a first contribution from a first participant in the plurality of participants. The first contribution is processed using one or more cognitive computing techniques to classify it, and a trait profile in the subset of trait profiles corresponding to the first participant is identified and updated.

Other embodiments include, without limitation, a computer-readable medium that includes instructions that enable a processing unit to implement one or more aspects of the disclosed methods and operations, as well as a system having a processor, memory, and application programs configured to implement one or more aspects of the disclosed methods and operations.

BRIEF DESCRIPTION OF THE SEVERAL VIEWS OF THE DRAWINGS

FIG. 3A illustrates a system capable of implementing some embodiments of the present disclosure.

FIG. 3C illustrates a system capable of monitoring collaborative activity, according to some embodiments of the present disclosure.

DETAILED DESCRIPTION

Figure 1:
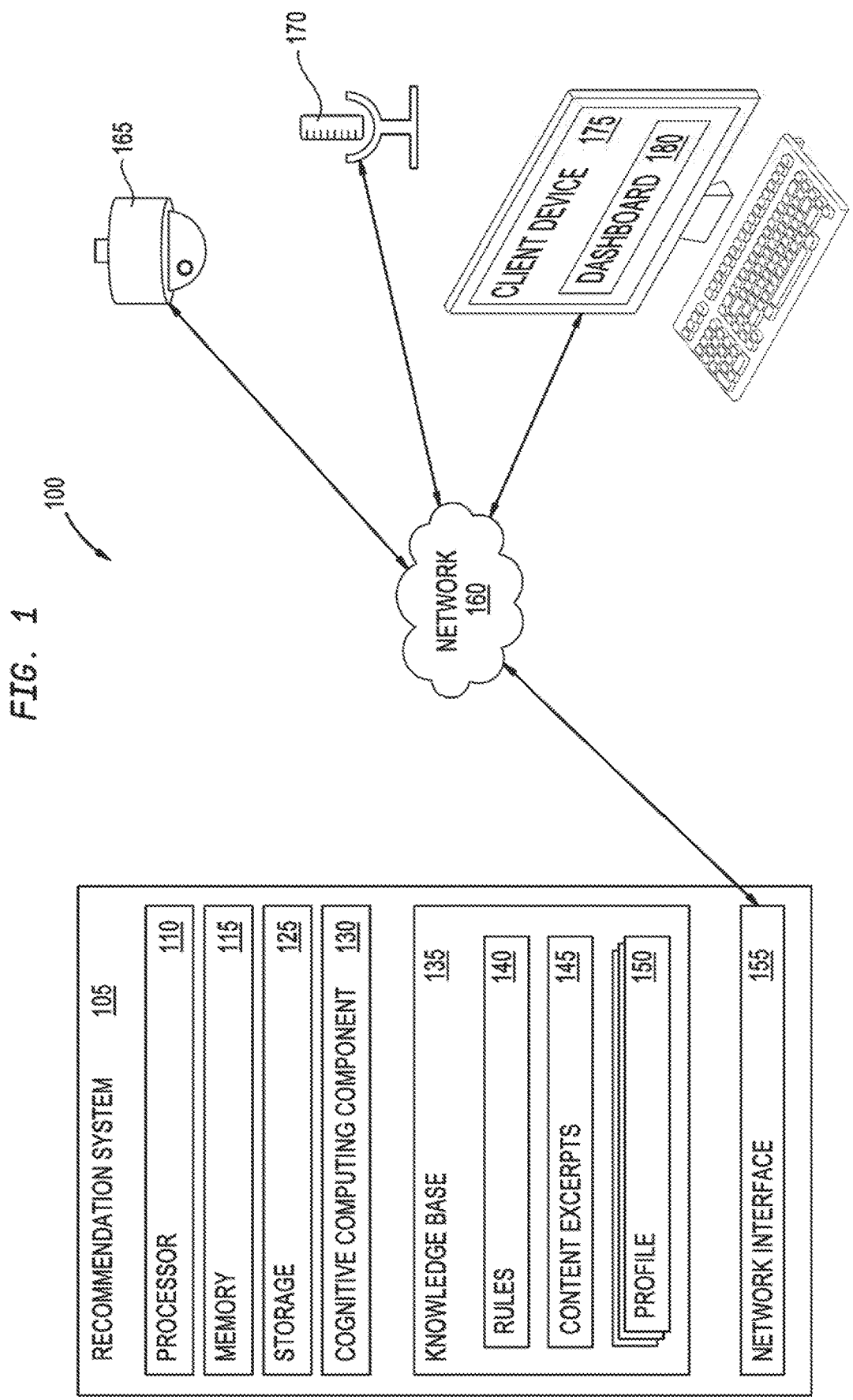
FIG. 1 is a block diagram of a system capable of implementing some embodiments of the present disclosure.

In order to ensure successful collaborations, such as in a design thinking session, careful selection of participants is essential. For example, for a session involving a new piece of software, it may be important to include individuals with expertise on multimedia, software architecture, knowledge engineering, and the like. This expertise can be spread across multiple people, depending on the needs of the project. For example, in a given application it may be important to have two or more individuals with knowledge engineering expertise, while in another application it might be important to include several multimedia experts. Similarly, in some sessions it may be important to have individuals who possess expertise in several areas, as opposed to expertise in any one.

In addition, the social and collaborative behavior of each individual participant is likely to be influential. For example, how shy a participant is will affect how much they add to the discussions, because a shy user may be less likely to interject when they have a good idea, or more likely to remain quiet even when they see flaws in a proposed solution. Similarly, an aggressive personality may interrupt others too frequently, thereby causing the contributions of the others to be lost. In some instances, however, it may be desirable to include at least one more aggressive person to act as a leader and shape the discussion. Furthermore, how inspirational an individual participant is can be an important aspect to consider. For example, whether the user tends to inspire other ideas or contributions, or support other contributions. It is also important to consider how disruptive the user is. For example, users who tend to go off-topic will slow down progress and impede a successful session. Similarly, how placid or easy-going a user is will likely play a role in the final results.

Importantly, each attribute or trait of a user must be considered in the context of the other attributes that user possesses, the expertise of the user, and the expertise and attributes of all other potential participants. For example, a particular session may require a user who is more aggressive, but only with respect to a particular area of expertise. Similarly, if a user may be a strong asset to a collaborative session despite the fact they are typically shy because they tend to be energetic and participative with regards to the domain that is being considered. In addition, a particular collaborative session may benefit from an aggressive participant, but only if that participant is also highly inspirational. In some embodiments, in addition to considering how a participant who is highly placid will interact and work with a participant who is shy, it is also important to note if a user who is typically shy becomes less so when certain other participants are present, or when participants with particular attributes are present.

Embodiments of the present disclosure utilize cognitive computing techniques to select a set of optimal participants for collaborative sessions based on attribute or trait profiles. In an embodiment, these profiles include values representing personality or character attributes of the participant, also referred to as social characteristics. In some embodiments, these values are generated using data gathered during previous collaborative sessions and processed using various cognitive computing techniques including machine learning, natural language processing, speech, object, and facial recognition, and the like. Advantageously, embodiments herein provide for objective determinations about each participant's social characteristics, as well as objective and more optimal selections of participants for future collaborative sessions, such as a design thinking session.

With reference now to FIG. 1, a block diagram of a system 100 capable of implementing some embodiments of the present disclosure is illustrated. The system 100 includes a Recommendation System 105, a Client Device 175, a Camera 165, and a Microphone 170. Of course, although a single Camera 165 and Microphone 170 are illustrated, in an embodiment there may be any number of sensor devices of any type, which may include cameras or other imaging devices, microphones, touch-sensitive devices, and the like. Generally, each sensor device monitors collaborative sessions to detect contributions from the participants. In the illustrated embodiment, each device in System 100 communicates using Network 160. Network 160 may be any communications network, and may be wired, wireless, or a combination thereof. In some embodiments, Network 160 may comprise multiple networks. For example, in an embodiment, Client Device 175 may communicate with sensor devices such as Camera 165 and Microphone 170 using a local area network, while Recommendation System 105 may be a remote server that communicates via a wide area network, such as the Internet. In some embodiments, however, Recommendation System 105 is a local device.

As illustrated, Client Device 175 includes an application Dashboard 180, which is described in more detail below. In some embodiments, Recommendation System 105 and Client Device 175 are the same device. For example, Dashboard 180 may run on Recommendation System 105. As illustrated, Recommendation System 105 contains Processor 110, Memory 115, Storage 125, Cognitive Computing Component 130, Knowledge base 135, and Network Interface 155. In the illustrated embodiment, Processor 110 retrieves and executes programming instructions stored in Memory 115 as well as stores and retrieves application data residing in Storage 125. Processor 110 is representative of a single CPU, multiple CPUs, a single CPU having multiple processing cores, and the like. Memory 115 is generally included to be representative of a random access memory. Storage 125 may be a disk drive storage device, and may include fixed and/or removable storage devices, such as fixed disk drives, removable memory cards, or optical storage, network attached storage (NAS), or storage area-network (SAN).

As will be discussed in more detail below, Cognitive Computing Component 130 performs various cognitive computing processes. These cognitive computing processes include, in various embodiments, processing data with one or more machine learning models, whether supervised or unsupervised, applying one or more natural language processing techniques, use of speech-to-text models, optical character recognition, and the like. Knowledge Base 135 contains Rules 140, Content Excerpts 145, and a plurality of Profiles 150. Rules 140 generally include any rules that are applicable to a collaborative session. In an embodiment, the Rules 140 are determined by the desired dynamics of the session. For example, in some sessions, the organizer of the collaborative session may want to encourage novel or "out-of-the-box" ideas, or may want the users to stay more on-topic. These desires can be reflected in Rules 140 for the session, which define how the users should participate. Other examples of Rules 140 include that participants should aim for quantity over quality, such as in a brainstorming session, to try to provide as many ideas as possible. Of course, in other sessions, the participants should strive for a smaller number of quality additions. Generally, in an embodiment, Rules 140 establish how participants should behave and how the collaborative session should proceed.

Content Excerpts 145 include fragments of previous collaborative sessions, such as contributions made by participants. In an embodiment, some or all of the contributions stored in Content Excerpts 145 may be associated with a participant who provided it, one or more concepts reflected in the contribution, a scope or domain of the collaborative session it was provided in, and the like. In some embodiments, contributions are also linked with other contributions that came before or after, in order to establish a temporal flow that reflects which contribution or participant inspired other contributions. In an embodiment, the content excerpts also include recordings, images, and other data to identify the participant or participants who provided each contribution.

Profiles 150 generally include attribute or trait values for each participant in various collaborative sessions. For example, in an embodiment, Profiles 150 includes an indication of a degree of shyness, aggressiveness, inspiration, disruption, and/or placidity for each user. In an embodiment, these attributes are determined based on processing contributions, such as Content Excerpts 145, using Cognitive Computing Component 130. For example, if a participant vocally provides a suggestion or other contribution, Microphone 170 may transmit the recording to Recommendation System 105. Cognitive Computing Component 130 can then process the recording in a number of ways. In one embodiment, Cognitive Computing Component 130 processes the recording using a voice recognition system to determine which participant provided the contribution.

Furthermore, Cognitive Computing 130 may use one or more speech-to-text techniques to generate a textual representation of the contribution, and then process said textual representation using one or more machine learning models or natural language processing techniques to identify concepts involved in the contribution, the type of contribution, the quality of the contribution, and the like. This is discussed in more detail below. In an embodiment, each Profile 150 also includes information about the expertise of the participant, prior work history or publications, participation in other projects, awards, courses attended, collaborative papers, technical reports, projects, and the like. In another embodiment, this information is preserved in a separate data structure within Knowledge Base 135.

Figure 2:
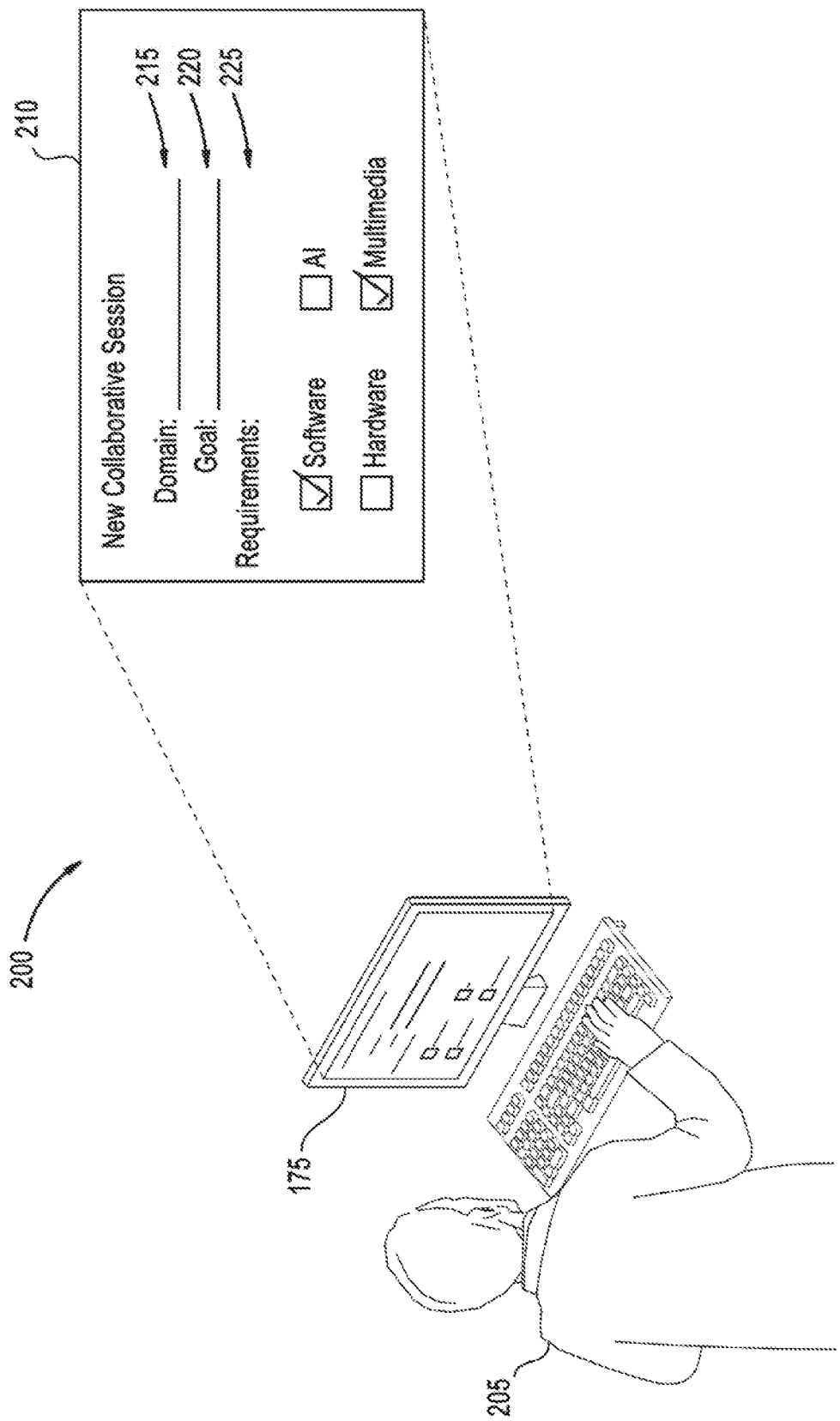
FIG. 2 illustrates a system capable of implementing some embodiments of the present disclosure.

FIG. 2 illustrates a system 200 capable of implementing some embodiments of the present disclosure. As illustrated, a User 205 is using Client Device 175 to initiate a new collaborative session, such as a design thinking session. This may be accomplished through, for example, Dashboard 180. In the illustrated embodiment, a graphic user interface (GUI) 210 is used to specify the domain or scope 215 of the session, the goal 220 of the session, and any requirements 225 of the session. For example, as illustrated, User 205 has specified that the session will require at least one individual with an expertise in software, as well as one with expertise in multimedia. Although illustrated as a series of checkboxes, the Requirements 225 may be provided in any form, including entered as natural language text, a selection from a list, and the like. Similarly, the Domain 215 and Goal 220 can be entered in any number of ways, including natural language, selection from a list, and the like. As will be discussed in more detail below, the Client Device 175 or Recommendation System 105 may use the domain, goal, requirements, and any other data to determine an optimal set of participants.

FIG. 3A illustrates a system 300 capable of implementing some embodiments of the present disclosure. As illustrated, Participants 325a-d are engaged in a collaborative activity. The system 300 includes several Sensor Devices 305a-d, including two Cameras 305a and 305c, and two Microphones 305b and 305c. As illustrated, the Participants 325a-d are using a Board 310, such as a whiteboard, chalkboard, smartboard, bulletin board, or even a simple wall, to keep track of their suggestions and solutions. For example, in the illustrated embodiment, the Participants 325a-d have already written some ideas 320 on the Board 310. Similarly, several ideas 315 have been posted on Board 310. In the illustrated embodiment, each Idea 315 is written on a sticky note or other paper.

Figure 3B:
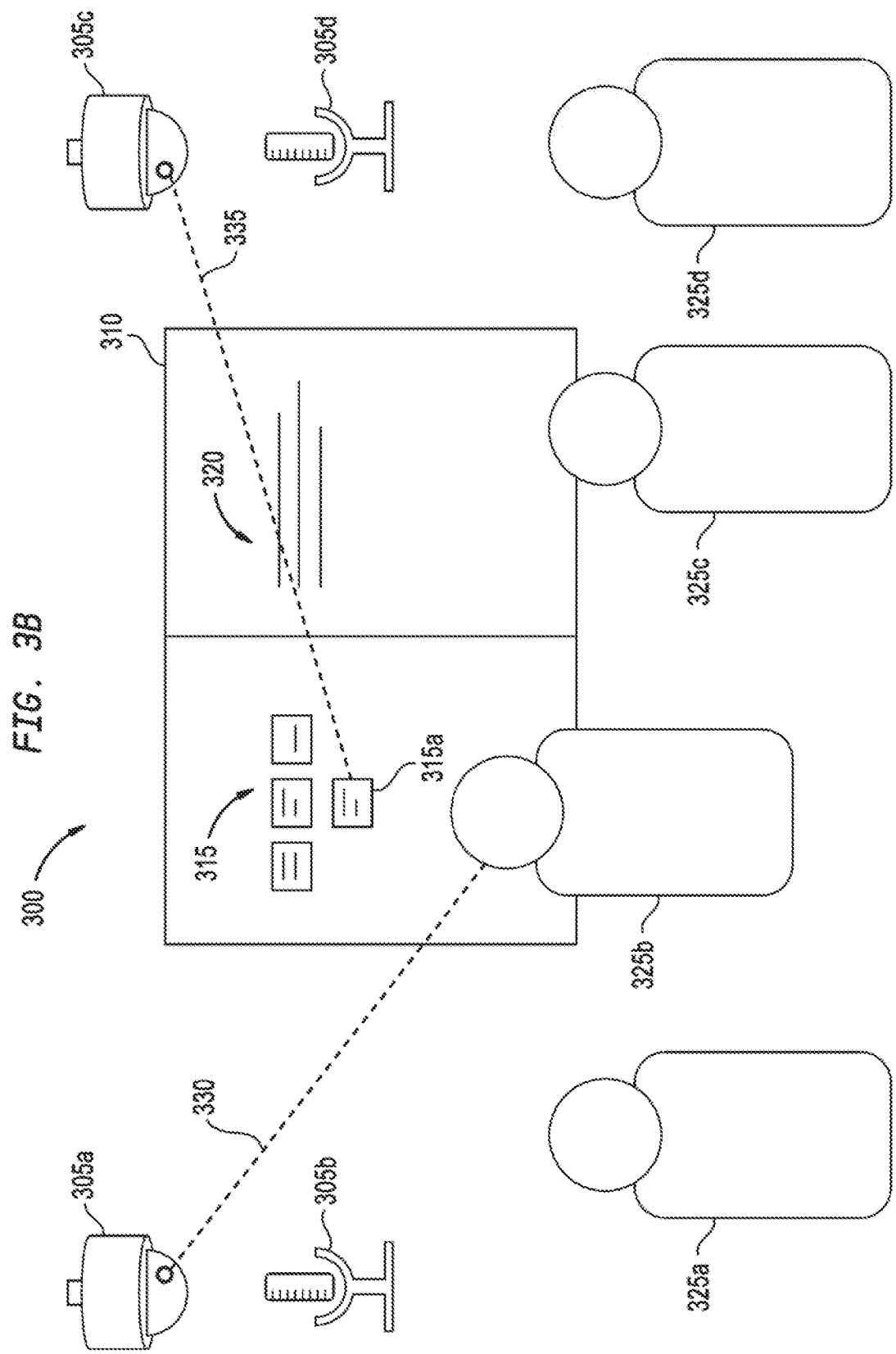
FIG. 3B illustrates a system capable of monitoring collaborative activity, according to some embodiments of the present disclosure.

FIG. 3B illustrates a Participant 325b providing a contribution, which is detected and recorded by System 300. As illustrated, Participant 325b has approached Board 310 and added an additional Idea 315a. As represented by the line 330 from Camera 305a to Participant 325b, one or more images of the face of Participant 325b are captured, which can be used with facial recognition software present on Recommendation System 105, for example, as a part of Cognitive Computing Component 130, to identify the Participant 325b. In some embodiments, however, the Participant 325b may be identified using, for example, voice recognition. For example, if the Participant 325b says something while approaching the Board 310, his voice may be used to identify him. Similarly, in some embodiments, Participant 325b may be identified based on a comment another participant makes. For example, if participant 325a says "good idea, Bob!" as the Idea 315a is posted, Microphone 305b or 305c may detect that, process it using speech-to-text, and then analyze it using one or more natural language processors or machine learning models to determine that "Bob" is the user who is providing the Idea 315a. Identifying Participant 325b may be accomplished in any other suitable way, such as via a barcode or other optical identifier, utilizing RFID, and the like.

As illustrated in FIG. 3B, Camera 305c is capturing one or more images of Idea 315a, as represented by line 335. Of course, Camera 305a could also capture such images, in addition to recording Participant 325b. The images captured of Idea 315a can be processed in a number of ways by Recommendation System 105. In an embodiment, Cognitive Computing Component 130 may use optical character recognition (OCR) to generate a textual representation of the Idea 315a. This can then be processed by one or more machine learning models or natural language processing techniques to identify the context of the Idea 315a, concepts it reflects, and the like. Of course, in some embodiments, users may provide written contributions in other ways, such as on a tabletop, or digitally via a computing device like a laptop. In this way, the System 300 can identify which participant provided each written contribution, as well as identify which concepts are reflected by the contribution.

By considering the established domain or scope of the session, as well as by completing similar analysis and processing of other contributions, the System 300 can also determine the context of the contribution, whether it is off-topic or out of scope, whether it interrupted another contribution, and the like. Similarly, Recommendation System 105 can determine whether the contribution inspired any other contributions, as well as how it was received by the group (e.g., whether it was praised or criticized). In some embodiments, it may be particularly useful to consider other contributions which are temporally close (e.g., contributions that happened within a predefined period of time before and after) as well as physically close (e.g., contributions that are written and placed nearby or within a predefined distance away).

FIG. 3C illustrates a Participant 325a providing some oral or verbal contribution 340. As illustrated by line 345, Microphone 305b detects the idea, and the data is provided to Recommendation System 105. In an embodiment, the voice data is processed by Cognitive Computing Component 130 using, in one embodiment, voice recognition to determine which participant provided the contribution. In an embodiment, Knowledge Base 135 stores voice and face exemplars for each Participant 325a-d in order to identify participants. In some embodiments, the System 300 may use other methods to identify participants, such as using facial recognition, as discussed above. In some embodiments, each Participant 325a-d wears a badge or ID including a barcode or other code that can be optically scanned by a sensor device such as Camera 305a or 305c. In some embodiments, each Participant 325a-d uses a proximity card to identify themselves when making a contribution. In other embodiments, contributions are made using a computing device such as a laptop that tracks each participant. Generally, any technique suitable to identify participants may be used in various embodiments.

In an embodiment, in addition to identifying which Participant 325a-d provided the oral contribution, Cognitive Computing Component 130 also processes the data using speech-to-text and various machine learning models and natural language processing techniques to determine concepts that the contribution include. Additionally, as above, Recommendation System 105 may be configured to determine the context of the contribution, whether it is within the scope of the session, whether it is related to the topic currently under discussion, and the like.

As used herein, a contribution is any participation in a collaborative session, and may be classified based on the concepts presented in it, the context of the contribution, the type of contribution, the person who provided it, and the like. For example, the context of a contribution may include other contributions in the session. Similarly, contributions may be classified according to type. Types of contribution include those that add new ideas, those that augment previous ideas, those that support ideas without adding new concepts, those that criticize ideas, and the like. Similarly, a contribution may be classified as on-topic or off-topic, or as an interruption. For example, if a verbal contribution is detected, Recommendation System 105 may also determine that another contribution was already ongoing, and determine that the ongoing contribution was interrupted.

In order to determine the concepts presented by a contribution, Cognitive Computing Component 130 processes the contribution using various knowledge engineering techniques. For example, in an embodiment, Cognitive Computing Component 130 employs natural language processing techniques, machine learning models, or both. In an embodiment, contributions are processed such that they can be represented as subject-predicate-object (SPO) triples in order to structure the concepts and identify related concepts. Similarly, SPO triples enable Cognitive Computing Component 130 to determine whether the included concept(s) are within the domain of the session, or are within the scope of the ongoing discussion, as evidenced by other preceding contributions and the contributions that follow.

In addition to determining the content of a contribution, in an embodiment, Cognitive Computing Component 130 processes data from contributions to determine various traits of the Participant 325a-d that provided the contribution. For example, with a verbal contribution, Cognitive Computing Component 130 may analyze the tone of the participant's voice, the volume of the contribution, frequencies of the voice, and the like. In such an example, a louder contribution may indicate either aggression or excitement, and analyzing the tone of the contribution or the concepts presented by it can help determine whether the participant is excited or angry. In an embodiment, written contributions can be analyzed in a similar manner. For example, written contributions 320 that are written larger or more rapidly may indicate excitement and energy.

In some embodiments, in addition to identifying the Participant 325a-d that provided the contribution, Recommendation System 130 is also configured to identify one or more other Participants 325a-d that also participated in the contribution. For example, if the contribution was an interruption, Recommendation System 130 can identify who was interrupted, in addition to identifying who interrupted them. In some embodiments, Recommendation System 130 may also track future contributions from the Participant 325a-d that was interrupted, in order to determine what effect, if any, the interruption had on that participant. For example, in an embodiment, it may be useful to determine whether a particular participant tends to become quieter and participate less after an interruption, or whether they become more boisterous or aggressive.

In some embodiments, Recommendation System 130 determines other Participants 325a-d who participated in a contribution. For example, if Participant 325b previously said or did something that inspired Participant 325a's Contribution 340, Recommendation System 130 may record an indication that Participant 325b also contributed to that contribution. Similarly, in this example, Recommendation System 130 may associate Participant 325a with the prior contribution provided by Participant 325b, to show that Participant 325a was inspired by the contribution.

In an embodiment, Recommendation System 105 is also configured to identify other prior contributions that are similar or contain similar concepts, whether from the ongoing collaborative session or from prior sessions. For example, in an embodiment, Cognitive Computing Component 130 may refer to Knowledge Base 135, and more specifically to Content Excerpts 145, to determine whether a particular Participant 325a-d makes similar contributions frequently, or whether other Participants 325a-d have made similar contributions in the past. In an embodiment, this enables Cognitive Computing Component 130 to determine whether the current contribution is similar or dissimilar from ones previously made by the participant and by other participants, which can help determine how dynamic the participant is. Similarly, if a participant provides a contribution that is very similar to a contribution that another participant already made during this session, Cognitive Computing Component 130 may determine that the participant is not as dynamic and tends to duplicate ideas.

In an embodiment, Recommendation System 105 tracks the quantity of contributions from each Participant to better predict how they will participate in future sessions. In some embodiments, a participant's contributions may be quantified on a per-minute or per-hour basis, or as an average number of contributions per collaborative session. Similarly, in some embodiments, a user's contributions are counted according to the type or context of the contribution. For example, in one embodiment, the number of new ideas per hour, interruptions per hour, and the like can be tracked for each participant.

In some embodiments, in addition to tracking the quantity of a participant's contributions, Recommendation System 105 also tracks the quality of those contributions. Quality may be determined in a number of ways. For example, in one embodiment, whether a concept introduced by a user's contribution begins appearing in other contributions, or is implemented in the final product, may increase the quality score for that contribution and user. Similarly, if a contribution is duplicative of other prior contributions in the session, the quality score will be reduced. The quality of a participant's contributions may generally be determined using cognitive computing techniques, such as machine learning and natural language processing.

In an embodiment, for each contribution detected, Recommendation System 105 may refine and update the Profile 150 of the identified participant(s) based on the content, concepts, and context of the contribution. In an embodiment, each Profile 150 contains an indication of the respective Participant 325a-d's social behavior or characteristics. For example, in one embodiment, each Profile 150 indicates a degree of shyness, a degree of aggressiveness, a degree of inspiration, a degree of disruptiveness, and/or a degree of placidity. Contributions can be used to determine the participant's traits in a number of ways. For example, in an embodiment, a participant's degree of shyness is related to the number of contributions a participant makes, particularly when the discussion involves an area in which the participant possesses expertise. If, at the end of the session, the number of contributions is lower than expected, the participant's degree of shyness may be increased.

In an embodiment, a participant's degree of aggression may be increased if it is determined that a contribution was in fact an interruption of another participant, or if the participant frequently talks over other participants. Similarly, Cognitive Computing Component 130 may perform sentiment analysis, for example by analyzing vocal tone, volume, and frequencies, to determine aggression. In an embodiment, a participant's degree of inspiration is defined as whether the participant encourages others to participate. For example, Cognitive Computing Component may perform sentiment analysis by analyzing vocal tone, volume, and frequencies. Similarly, natural language processing techniques can be employed to confirm that the participant is encouraging others. Additionally, in an embodiment, quantitative analysis of the other participants can be used to determine a level of inspiration for a participant. For example, if the other participants provided more contributions than expected, particularly for shy participants, it can be determined that a participant tends to inspire others and encourage participation.

In an embodiment, a user's degree of disruptiveness is controlled by whether the participant tends to stay on-topic, and whether they tend to interrupt others. For example, Cognitive Computing Component 130 may determine concepts presented in each contribution to determine if the participant is off-topic. Similarly, Cognitive Computing Component 130 may analyze how other participants respond to the contribution to determine whether it is on-topic or out-of-scope. In an embodiment, a user's degree of placidity is determined based on how easy-going or relaxed the participant is, or whether the participant is easily upset or worried. For example, sentiment analysis may be employed to determine the mood of a participant. Similarly, if the participant collaborates or participates with a large number of other participants, that user may be classified as placid. Additionally, in some embodiments, Cognitive Computing Component 130 determines how the user responds when other participants interrupt, criticize, or are aggressive.

In an embodiment, once a collaborative session has reached an end, one or more of the Participants 325a-d may be provided with a digest that summarizes the session, and includes an analysis of each participant's conduct. In an embodiment, only the user or participant who initiated the session may be provided the digest. In an embodiment, the digest can display the traits of each of the participants, and/or an indication of how each trait was updated during the session. In some embodiments, the digest includes each contribution detected, the identified participant(s), and the trait(s) implicated by the contribution. Similarly, in some embodiments, the digest may include an indication of its reasoning for each determination, in order to facilitate training of the Recommendation System 105.

In an embodiment, the user may provide corrections to the digest. For example, if the digest identified a particular Participant 325a as having provided a contribution, when in fact that contribution was provided by Participant 325b, the user can indicate that the Recommendation System 105 misidentified the participants. Upon receiving the correction, Recommendation System 105 can refine its models, for example, by adjusting weights of the Cognitive Computing Component 130. Similarly, Recommendation System 105 may update the Profiles 150 of both participants, in order to associate the contribution with the appropriate participant(s).

As another example, the digest may indicate that a particular contribution was determined to be aggressive, and the user may indicate that the participant was not aggressive, merely excited. As above, this can trigger the Recommendation System 105 to refine its models and update the affected Profiles 150. As yet another example, the user may correct the digest in such a way as to avoid adjusting the models. For example, the Recommendation System 130 may detect that a particular participant remained silent the entire session, and therefore determine that the participant is very shy. If the user knows that the shy participant was invited to attend the session as an observer and not participant, the digest can be corrected such that the Recommendation System 130 does not change the participant's profile to indicate he is shy. However, it would not be appropriate to adjust the weights or refine the models of the Cognitive Computing Component 130, because the system was correct in determining that the participant was abnormally quiet.

Figure 4:
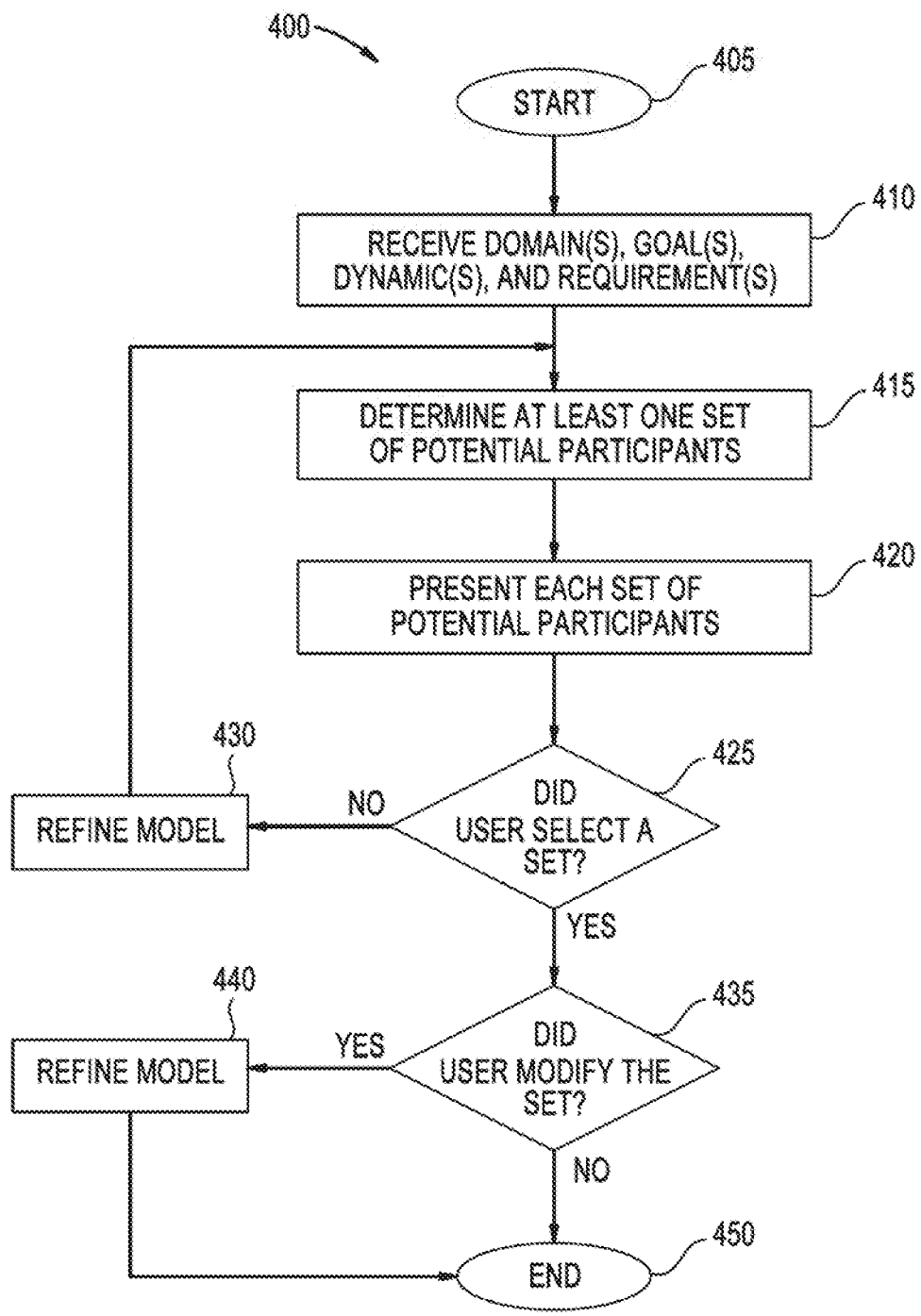
FIG. 4 is a flow chart illustrating a method of selecting collaborative participants using cognitive computing, according to one embodiment of the present disclosure.

FIG. 4 is a flow chart illustrating a method 400 of selecting collaborative participants using cognitive computing, according to one embodiment of the present disclosure. As illustrated, the method 400 begins at block 405. At block 410, Recommendation System 105 receives domain(s), goal(s), dynamic(s), and/or requirement(s) for a new collaborative session. These may be provided by a user using, for example, Dashboard 180. In an embodiment, the dynamic(s) selected by the user help to define the rules for the session. For example, the user may indicate that a "brainstorming" dynamic is desired, which suggests that the user would like a large quantity of ideas, wants to encourage out-of-the-box thinking, and the like. Other dynamics include card sorting, where participants work to organize ideas, and the like.

In an embodiment, the user may also provide a desired number of participants (or a range of appropriate group sizes), the desired social traits of participants, or pre-select one or more desired participants. For example, the user may believe that the particular project would be better handled by a group of participants that are more aggressive than the average group. Similarly, the user may want a particular participant involved, and allow the Recommendation System 130 to select the remaining participants that would provide the optimal group.

At block 415, Recommendation System 105 determines at least one set of participants. For example, Recommendation System 105 may compare the requirements and domain of the session with each potential participant, and identify a subset of users who are able to participate. Additionally, Recommendation System 105 considers the personality traits contained in Profiles 150 to determine a set of participants that complement each other and would work well together. This determination may be made, for example, using Cognitive Computing Component 130 via predefined rules or one or more machine learning models. For example, in an embodiment, after each collaborative session, the user may be prompted to indicate the quality of the session based on the participants selected. If the user indicates that the selected participants worked well together, the models may be strengthened to select similar participant sets in the future. Conversely, if the user indicates that the participants clashed or did not work well together, the Recommendation System 105 may refine and adjust the models to avoid selecting similar participant groups in the future.

In another embodiment, a user who is familiar with the participants may provide an indication to a set of participants about whether he believes their traits would work well together, without actually conducting a session. In an embodiment, Recommendation System 105 may also consider the particular participants themselves, in addition to their determined traits. For example, if two particular participants have clashed or disagreed strongly in prior collaborative sessions, Recommendation System 105 may ensure that any recommended subsets of participants do not include both participants. This determination can be made, for example, because a user previously indicated that the particular participants do not work well together, based on prior participations and contributions in which the two participants collaborated, and the like.

Similarly, in an embodiment, Recommendation System 105 may determine that two participants tend to provide similar contributions, such that including both in the same session would be duplicative. Recommendation System 105 may therefore decide to select one of the participants, but not both. In an embodiment, Recommendation System 105 may similarly identify two or more participants that work well together, and include both of these participants in a set of recommended participants. As above, the determination that two or more participants work well together can be the result of a user indicating that the users mesh well, detected contributions from prior collaborations, and the like.

In an embodiment, Recommendation System 105 may provide more than one set of participants to the user. For example, if two or more sets of participants are expected to perform similarly, Recommendation System 105 may provide all of them to the user, to allow the user to select which set he would like to work with. Similarly, in an embodiment, if it is determined that two users do not work well together, Recommendation System 105 may provide two sets of participants, one including each participant, and allow the user to select which participant or set of participants he wants to include.

Further, in an embodiment where the user provided one or more initial participants, Recommendation System 105 may determine that the optimal set does not include at least one of those initial participants. In such an embodiment, Recommendation System 105 may provide several sets of participants, some including the at least one initial participant and some not. In an embodiment, Recommendation System 105 also provides an indication of how optimal the set is, indicating how well the participants are expected to work together. This may allow the user to determine whether including the identified participant justifies a potential reduction in efficiency.

In block 420, the one or more sets of potential participants are presented to the user. At block 425, it is determined whether the user selected one of the sets. If the user did not, indicating that none of the sets are acceptable, the method 400 proceeds to block 430, where the model is refined. For example, the model may be provided an indication that the generated set is not an optimal set of participants, and thereby be trained to provide better sets in the future. The method 400 then proceeds to block 415, where at least one additional set of potential participants is determined.

If, however, the user selects one of the sets of potential participants at block 425, the method 400 proceeds to block 435, where it is determined whether the user modified the set. For example, the user may accept the set of participants, but modify it by adding an additional participant, removing a participant, switching one participant who was selected for another who was not, and the like. If, at block 435, it is determined that the user modified the set, the method 400 proceeds to block 440 where the model is refined so as to provide improved selections in the future. Finally, the method 400 terminates at block 450.

In some embodiments, even if the user modifies the set, the method 400 may terminate without refining the models. For example, if the user manually selects an additional participant because he wants that participant to observe the session and not participate, the Recommendation System 105 may not be refined based on that addition. Similarly, the user may manually remove a user because he knows that the user is occupied with other projects, is traveling, is sick, or otherwise cannot participate in the session. In such an example, the models should not be refined because the generated set was still an optimal selection. If, at block 435, the user does not modify the selected set, the method 400 proceeds to block 450, where it terminates. At this point, the user can proceed to schedule the collaborative session with the identified participants.

Figure 5:
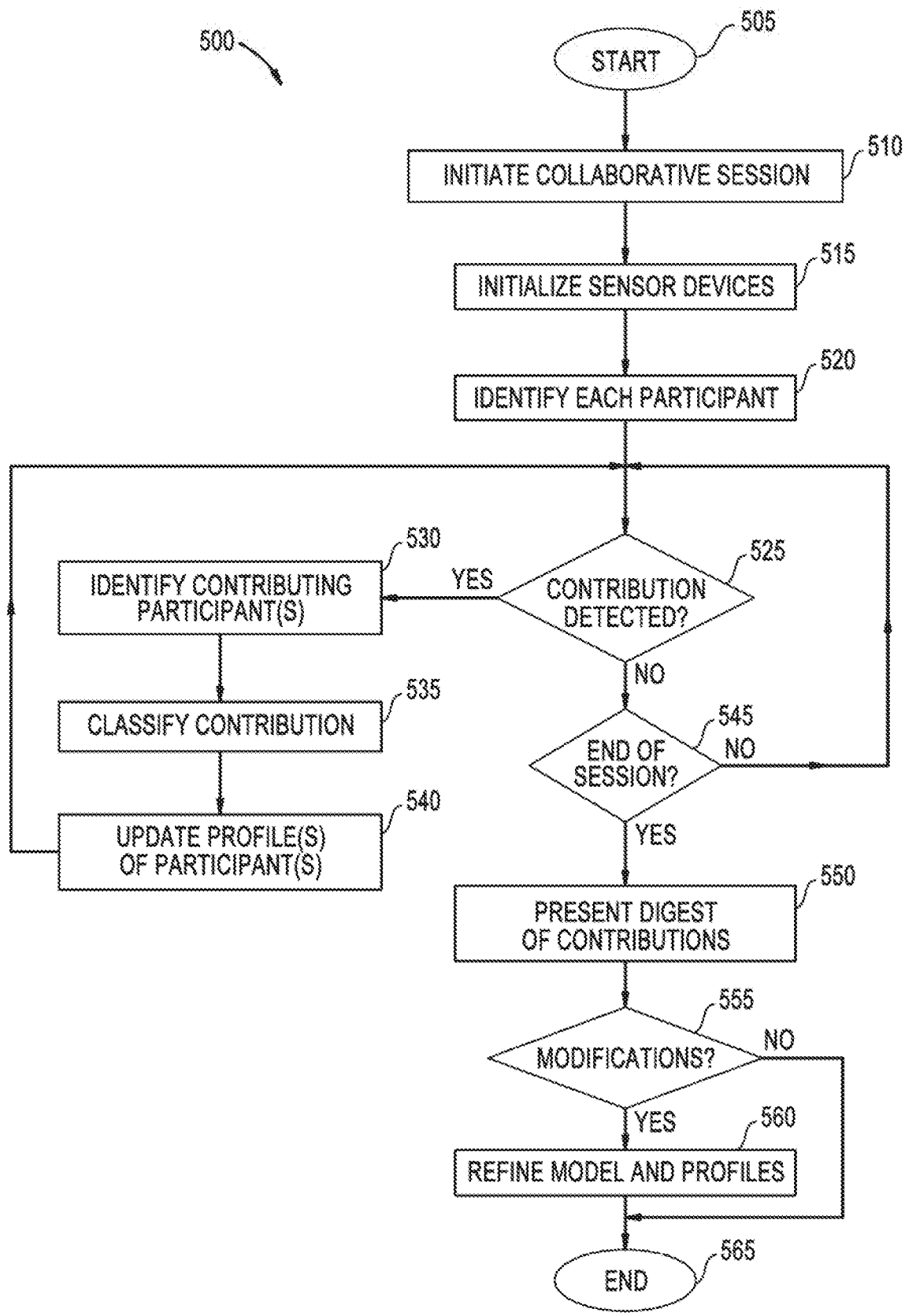
FIG. 5 is a flow chart illustrating a method of monitoring collaborative activity using cognitive computing, according to one embodiment disclosed herein.

FIG. 5 is a flow chart illustrating a method 500 of monitoring collaborative activity using cognitive computing, according to one embodiment disclosed herein. The method 500 begins at block 505. At block 510, a collaborative session, such as a design thinking session, is initiated. This may be, for example, at the request of a user. At block 515, one or more sensor devices are initialized. For example, cameras, microphones, and the like that will be used to detect contributions are initialized. At block 520, each participant is identified to determine the set of participants who are a part of the collaborative session. In some embodiments, however, participants are not identified until they provide a contribution.

At block 525, it is determined whether a contribution has been detected. That is, Recommendation System 105 processes data collected using sensor devices to determine whether a contribution is ongoing or has begun. If a contribution is detected, the method 500 proceeds to block 530, where Recommendation System 105 identifies the participant or participants who are associated with the contribution. That is, the participants who provided the contribution, inspired it, were inspired by it, interrupted it, and the like. The method 500 continues to block 535, where the contribution is classified. As discussed above, this may include determining the type of contribution, the concepts presented by it, the context of it, and the like. At block 540, the profile or profiles of the participant or participants are updated to reflect the contribution, and the method 500 returns to block 525 to detect more contributions.

Of course, in an embodiment, a contribution may be interrupted by another contribution, such that the concepts the participant intended to include are not fully represented. In an embodiment, Recommendation System 105 may still attempt to process the first contribution to the extent possible, such as by identifying as many concepts as it can. In an embodiment, if the original participant initiates another contribution after the interruption, for example, to continue his previous contribution, the Recommendation System 105 may determine that the new contribution is, in fact, the same as the old contribution that was interrupted, and respond accordingly.

At block 525, if no additional contributions are detected at this time, the method 500 proceeds to block 545, where it is determined whether the session has ended. The session may end at the request of one or more of the participants, at the end of a predetermined period of time, and the like. If the session has not ended, the method 500 returns to block 525 to detect contributions. Once the session has ended, the method 500 proceeds to block 555, where it is determined whether any modifications are necessary. For example, as described above, the Recommendation System 105 may provide a digest to an administrative user who organized the session. The user may correct identification problems, adjust how a contribution affects the participant's profile, and the like. If modifications are received, the method 500 proceeds to block 560, where the Cognitive Computing Component 130 is refined, and the affected Profiles 150 are updated. Finally, the method 500 proceeds to block 565, where it ends. Similarly, if, at block 555, it is determined that no modifications are required, the method 500 proceeds to block 565 where it terminates.

Figure 6:
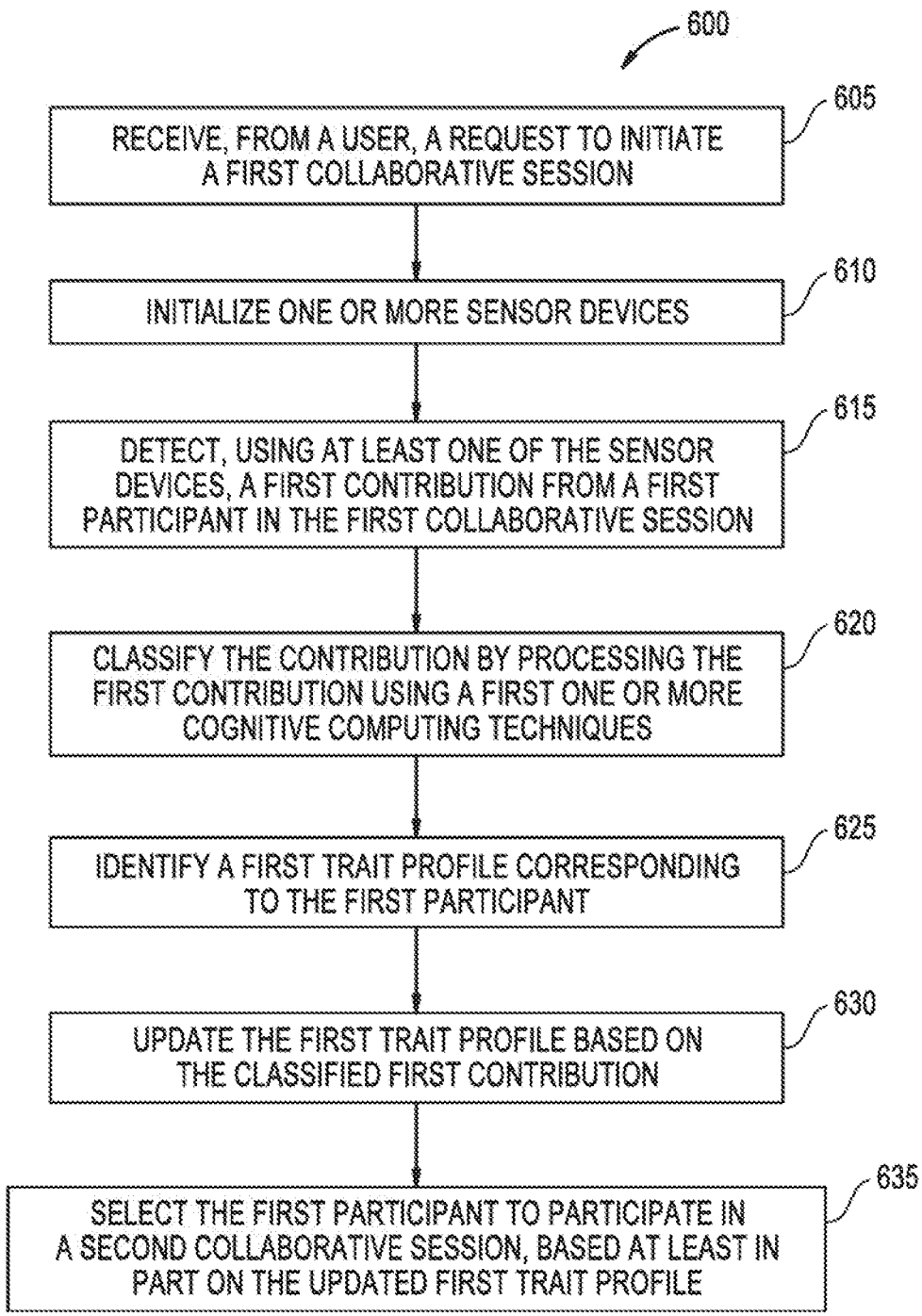
FIG. 6 is a diagram illustrating a method of monitoring collaborative activity using cognitive computing, according to one embodiment disclosed herein.

FIG. 6 is a diagram illustrating a method 600 of monitoring collaborative activity using machine learning, according to one embodiment disclosed herein. The method 600 begins at block 605, where Recommendation System 105 receives, from a user, a request to initiate a first collaborative session. At block 610, the system initializes one or more sensor devices. At block 615, Recommendation System 105 detects, using at least one of the sensor devices, a first contribution from a first participant in the first collaborative session. Next, at block 620, Recommendation System 105 classifies the contribution by processing the first contribution using a first one or more cognitive computing techniques. For example, as discussed above, Recommendation System 105 may use speech-to-text techniques, optical character recognition techniques, natural language processing techniques, machine learning models, and the like. At block 625, the system identifies a first trait profile corresponding to the first participant, and at block 630, Recommendation System 105 updates the first trait profile based on the classified first contribution. Finally, at block 635, Recommendation System 105 selects the first participant to participate in a second collaborative session, based at least in part on the updated first trait profile.

Figure 7:
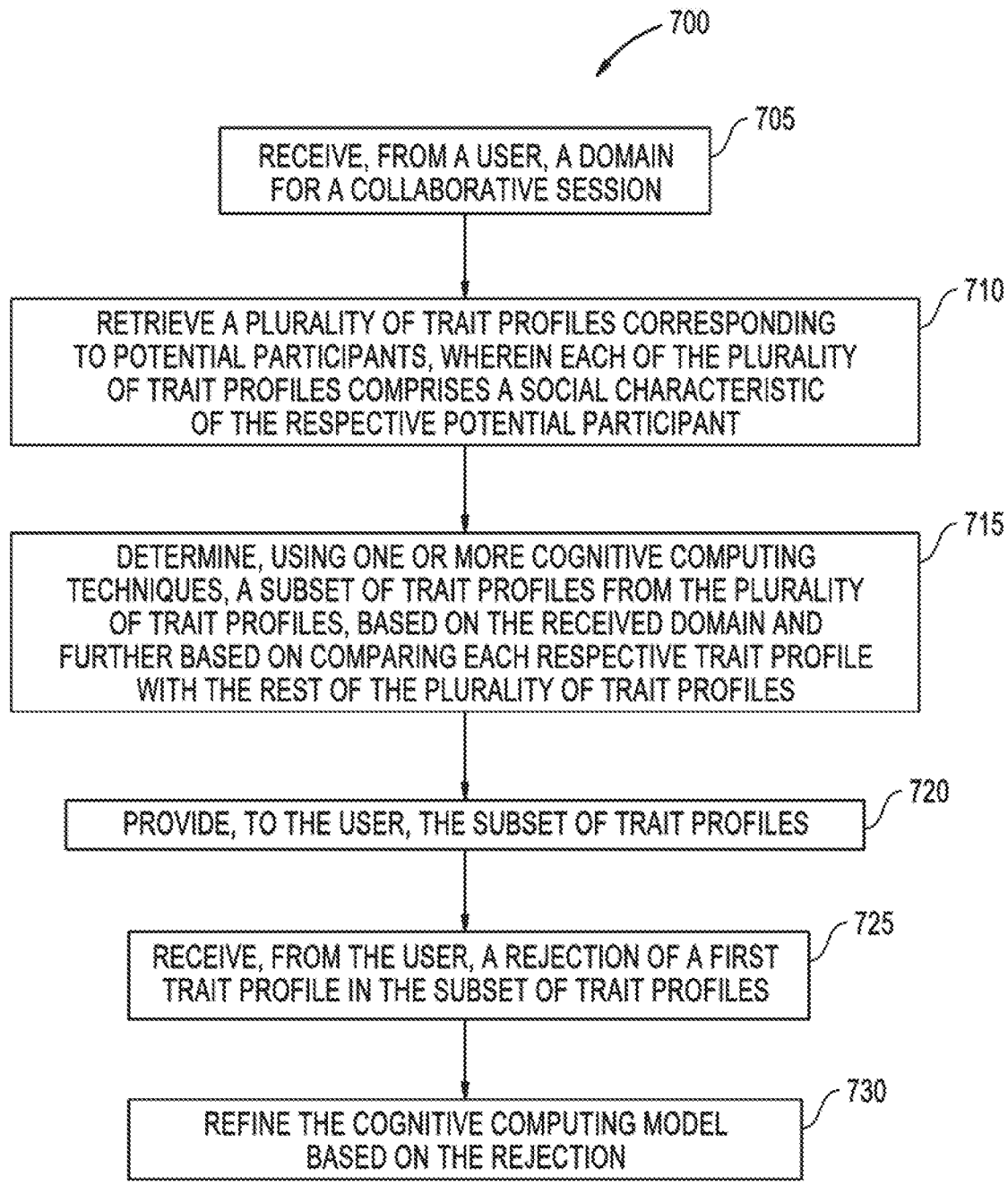
FIG. 7 is a diagram illustrating a method of selecting collaborative participants using cognitive computing, according to one embodiment of the present disclosure.

FIG. 7 is a diagram illustrating a method 700 of selecting collaborative participants using cognitive computing, according to one embodiment of the present disclosure. The method 700 begins at block 705, where Recommendation System 105 receives, from a user, a domain for a collaborative session. At block 710, Recommendation System 105 retrieves a plurality of trait profiles corresponding to potential participants, wherein each of the plurality of trait profiles comprises a social characteristic of the respective potential participant. Additionally, at block 715, Recommendation System 105 determines, using one or more cognitive computing techniques, a subset of trait profiles from the plurality of trait profiles, based on the received domain and further based on comparing each respective trait profile with the rest of the plurality of trait profiles. For example, as discussed above, Recommendation System 105 may utilize machine learning models, natural language processing techniques, and the like. At block 720, the subset of trait profiles are provided to the user. At block 725, Recommendation System 105 receives, from the user, a rejection of a first trait profile in the subset of trait profiles. Finally, at block 730, the Recommendation System 105 refines the cognitive computing model based on the rejection.

Figure 8:
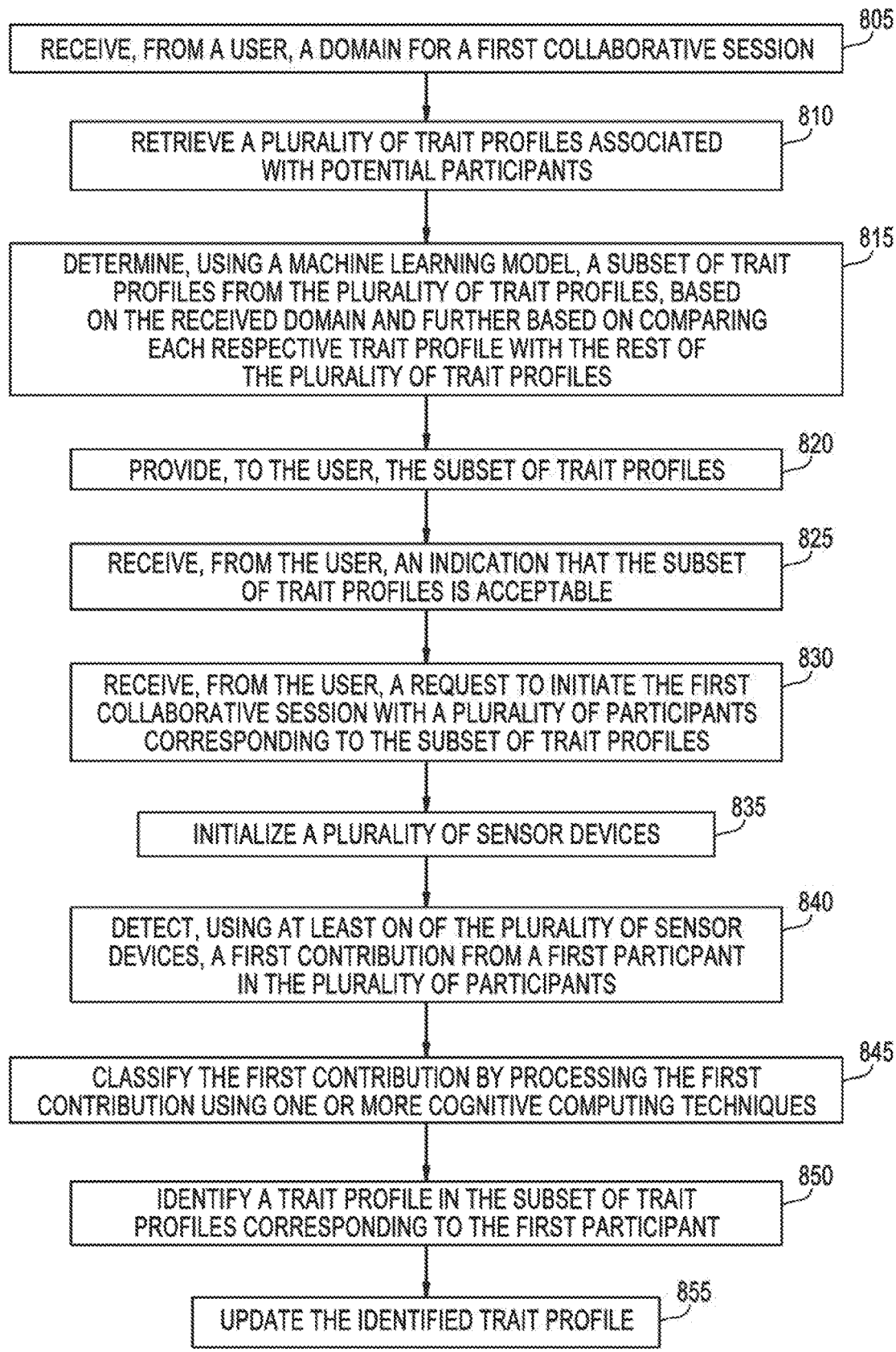
FIG. 8 is a diagram illustrating a method of selecting collaborative participants using machine learning and monitoring collaborative activity using cognitive computing, according to one embodiment of the present disclosure.

FIG. 8 is a diagram illustrating a method 800 of selecting collaborative participants using machine learning and monitoring collaborative activity using natural language processing, according to one embodiment of the present disclosure. At block 805, Recommendation System 105 receives, from a user, a domain for a first collaborative session. At block 810, a plurality of trait profiles associated with potential participants are retrieved. At block 815, Recommendation System 105 determines, using a machine learning model, a subset of trait profiles from the plurality of trait profiles, based on the received domain and further based on comparing each respective trait profile with the rest of the plurality of trait profiles. The method 800 then proceeds to block 820, where the subset of trait profiles are provided to the user. At block 825, Recommendation System 105 receives, from the user, an indication that the subset of trait profiles is acceptable.

The method 800 then proceeds to block 830, where Recommendation System 105 receives, from the user, a request to initiate the first collaborative session with a plurality of participants corresponding to the subset of trait profiles. At block 835, a plurality of sensor devices are initialized. At block 840, Recommendation System 105 detects, using at least one of the plurality of sensor devices, a first contribution from a first participant in the plurality of participants. At block 845, Recommendation System 105 classifies the first contribution by processing the first contribution using one or more cognitive computing techniques. At block 850, Recommendation System 105 identifies a trait profile in the subset of trait profiles corresponding to the first participant. Finally, at block 855, Recommendation System 105 updates the identified trait profile.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications Cognitive Computing Component 130 or related data available in the cloud. For example, the Cognitive Computing Component 130 could execute on a computing system in the cloud and maintain Profiles 150, classify contributions, and the like. In such a case, the Cognitive Computing Component 130 could classify contributions and update profiles in the cloud, and store the Profiles 150 and Content Excerpts 145 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system comprising:
a processor;
one or more sensor devices; and
a computer memory storing a program, which, when executed on the processor, performs an operation comprising:
receiving a request to initiate a first collaborative session;
initializing the one or more sensor devices;
detecting, using at least one of the sensor devices, a first contribution from a first participant in the first collaborative session;
classifying the first contribution by processing the first contribution using a first one or more cognitive computing techniques;
determining a dynamism of the first participant based on:
(i) similarity of a subject matter of the first contribution to a subject matter of one or more previous contributions from the first participant in the first collaborative session and at least one previous collaborative session, and
(ii) a similarity of the subject matter of the first contribution to a subject matter of one or more previous contributions from at least one other participant in the first collaborative session;
identifying a first trait profile corresponding to the first participant;
updating the first trait profile based on the classified first contribution and the determined dynamism; and
selecting the first participant to participate in a second collaborative session, based at least in part on the updated first trait profile.

2. The system of claim 1, wherein classifying the first contribution comprises determining one or more concepts present in the first contribution.

3. The system of claim 2, wherein classifying the first contribution further comprises determining whether the first contribution is within a scope of the first collaborative session.

4. The system of claim 2, wherein classifying the first contribution further comprises identifying at least one similar contribution from at least one previous collaborative session based on the determined one or more concepts.

5. The system of claim 1, the operation further comprising:
determining that a second participant also participated in the first contribution;
identifying a second trait profile corresponding to the second participant; and
updating the second trait profile based on the classified first contribution.

6. The system of claim 1, wherein classifying the first contribution comprises determining that the first contribution was an interruption.

7. The system of claim 1, the operation further comprising:
providing a digest comprising an analysis of conduct of each participant during the first collaborative session.

8. The system of claim 7, the operation further comprising:
receiving an indication that the analysis of the conduct of at least one of the participants is not correct; and
updating a trait profile of the at least one participant based on the received indication.

9. The system of claim 1, the operation further comprising, prior to receiving the request to initiate the first collaborative session:
receiving a domain for the first collaborative session;
retrieving a plurality of trait profiles associated with potential participants, wherein each of the plurality of trait profiles comprises a social characteristic of the respective potential participant;
determining, using a second one or more cognitive computing techniques, a subset of trait profiles from the plurality of trait profiles, based on the received domain and further based on comparing each respective trait profile with the rest of the plurality of trait profiles;
providing the subset of trait profiles;
receiving a rejection of a trait profile in the subset of trait profiles; and
refining the second one or more cognitive computing techniques based on the rejection.

10. A computer-readable storage medium having computer-readable program code embodied therewith, the computer-readable program code executable by one or more computer processors to perform an operation comprising:
receiving a domain for a collaborative session;
retrieving a plurality of trait profiles corresponding to potential participants, wherein each of the plurality of trait profiles comprises a social characteristic of the respective potential participant and a determined dynamism, wherein the dynamism is based on a similarity of a subject matter of contributions made by the respective potential participant across collaborative sessions and the similarity of the subject matter of the contributions made by the respective potential participant to a subject matter of contributions from other potential participants in the collaborative sessions;

determining, using one or more cognitive computing techniques, a subset of trait profiles from the plurality of trait profiles, based on the received domain and further based on comparing each respective trait profile with the rest of the plurality of trait profiles;

providing the subset of trait profiles;

receiving a rejection of a first trait profile in the subset of trait profiles; and refining the one or more cognitive computing techniques based on the rejection.

11. The computer-readable storage medium of claim 10, wherein the social characteristic of each of the respective potential participants comprises an assessment of at least one of:
   (i) a degree of shyness;
   (ii) a degree of aggressiveness;
   (iii) a degree of inspiration;
   (iv) a degree of disruptiveness; and
   (v) a degree of placidity.

12. The computer-readable storage medium of claim 11, wherein the social characteristic of each of the respective potential participants was determined during at least one prior collaborative session.

13. The computer-readable storage medium of claim 10, wherein determining the subset of trait profiles comprises:
   determining, based on a second and a third trait profile of the plurality of trait profiles, that a second and third participant corresponding to the second and third trait profiles, respectively, work well together; and
   adding the second and third trait profiles to the subset of trait profiles.

14. The computer-readable storage medium of claim 10, wherein determining the subset of trait profiles comprises:
   determining, based on a second and a third trait profile of the plurality of trait profiles, that a second and third participant corresponding to the second and third trait profiles, respectively, would conflict;
   adding the second trait profile to the subset of trait profiles; and
   rejecting the third trait profile.

15. The computer-readable storage medium of claim 10, the operation further comprising:
   receiving a selection of a second trait profile that was not included in the subset of trait profiles; and
   refining the one or more cognitive computing techniques based on the selection.

16. A method comprising:
   receiving a domain for a first collaborative session;
   retrieving a plurality of trait profiles associated with potential participants;
   determining, using a machine learning model, a subset of trait profiles from the plurality of trait profiles, based on the received domain and further based on comparing each respective trait profile with the rest of the plurality of trait profiles;
   providing the subset of trait profiles;
   receiving an indication that the subset of trait profiles is acceptable;
   receiving a request to initiate the first collaborative session with a plurality of participants corresponding to the subset of trait profiles;
   initializing a plurality of sensor devices;
   detecting, using at least one of the plurality of sensor devices, a first contribution from a first participant in the plurality of participants;
   classifying the first contribution by processing the first contribution using one or more cognitive computing techniques;
   determining a dynamism of the first participant based on:
      (i) a similarity of a subject matter of the first contribution to a subject matter of one or more previous contributions from the first participant in the first collaborative session and at least one previous collaborative session, and
      (ii) a similarity of the subject matter of the first contribution to a subject matter of one or more previous contributions from at least one other participant in the first collaborative session;
   identifying a trait profile in the subset of trait profiles corresponding to the first participant; and
   updating the identified trait profile based on the classified first contribution and the determined dynamism.

17. The method of claim 16, wherein classifying the first contribution comprises determining one or more concepts present in the first contribution.

18. The method of claim 16, further comprising:
   providing a digest comprising an analysis of conduct of each participant during the first collaborative session.

19. The method of claim 16, wherein each of the plurality of trait profiles comprises a social characteristic of the respective potential participant, wherein the social characteristic of each of the respective potential participants comprises an assessment of at least one of:
   (i) a degree of shyness;
   (ii) a degree of aggressiveness;
   (iii) a degree of inspiration;
   (iv) a degree of disruptiveness; and
   (v) a degree of placidity.

20. The method of claim 19, wherein the social characteristic of each of the respective potential participants was determined during at least one prior collaborative session.

* * * * *